(12) United States Patent
Ramprasad et al.

(10) Patent No.: US 8,699,993 B2
(45) Date of Patent: Apr. 15, 2014

(54) DEVICE INITIATED REPLENISHMENT PROCEDURES FOR WIRELESS DEVICES

(75) Inventors: Satish Ramprasad, Miramar, FL (US); Sergio Rivera, Miami, FL (US)

(73) Assignee: TracFone Wireless, Inc., Miami, FL (US)

(*) Notice: Subject to any disclaimer, the term of this patent is extended or adjusted under 35 U.S.C. 154(b) by 0 days.

(21) Appl. No.: 13/565,935

(22) Filed: Aug. 3, 2012

(65) Prior Publication Data

US 2014/0038545 A1 Feb. 6, 2014

(51) Int. Cl.
*H04M 11/00* (2006.01)
*H04W 4/00* (2009.01)

(52) U.S. Cl.
USPC ........ 455/405; 455/406; 455/432.1; 370/252; 380/270

(58) Field of Classification Search
USPC ......... 455/405, 406, 432.1; 370/252; 380/270
See application file for complete search history.

(56) References Cited

U.S. PATENT DOCUMENTS

| | | | |
|---|---|---|---|
| 7,131,578 B2* | 11/2006 | Paschini et al. | 235/379 |
| 7,444,141 B2 | 10/2008 | Rivera et al. | |
| 7,450,927 B1* | 11/2008 | Creswell et al. | 455/405 |
| 7,909,242 B2* | 3/2011 | Paschini et al. | 235/379 |
| 8,255,281 B2* | 8/2012 | Benson et al. | 705/26.1 |
| 8,270,310 B2* | 9/2012 | Raleigh | 370/252 |
| 8,321,526 B2* | 11/2012 | Raleigh | 709/217 |
| 8,331,901 B2* | 12/2012 | Raleigh | 455/405 |
| 8,385,916 B2* | 2/2013 | Raleigh | 455/432.1 |
| 2003/0026404 A1* | 2/2003 | Joyce et al. | 379/144.01 |
| 2004/0185827 A1* | 9/2004 | Parks | 455/406 |
| 2012/0314864 A1* | 12/2012 | Ramprasad et al. | 380/270 |
| 2013/0080333 A1* | 3/2013 | Kamotskyy et al. | 705/75 |

* cited by examiner

*Primary Examiner* — Jinsong Hu
*Assistant Examiner* — Jean Chang
(74) *Attorney, Agent, or Firm* — Baker & Hostetler LLP

(57) ABSTRACT

A method, device and system are provided for wireless device-initiated automatic replenishment of internally-stored account parameters associated with an amount of authorization for usage of the wireless device (e.g., prepaid amount of airtime minutes, data usage, messages, etc.). Upon determining within the wireless device that the account parameter(s) should be replenished, the wireless device transmits a message to a control server indicating that the wireless device intends to perform the determined replenishment according to the replenishment parameters stored within the wireless device. The wireless device delays performance of the replenishment for a predetermined period of time to determine whether the control server provides a response containing updated replenishment parameters. Depending upon whether the wireless device receives a response from the control server during the time period, the wireless device then replenishes the internally-stored account parameter(s) using either the previously stored replenishment parameters or the updated replenishment parameters.

24 Claims, 10 Drawing Sheets

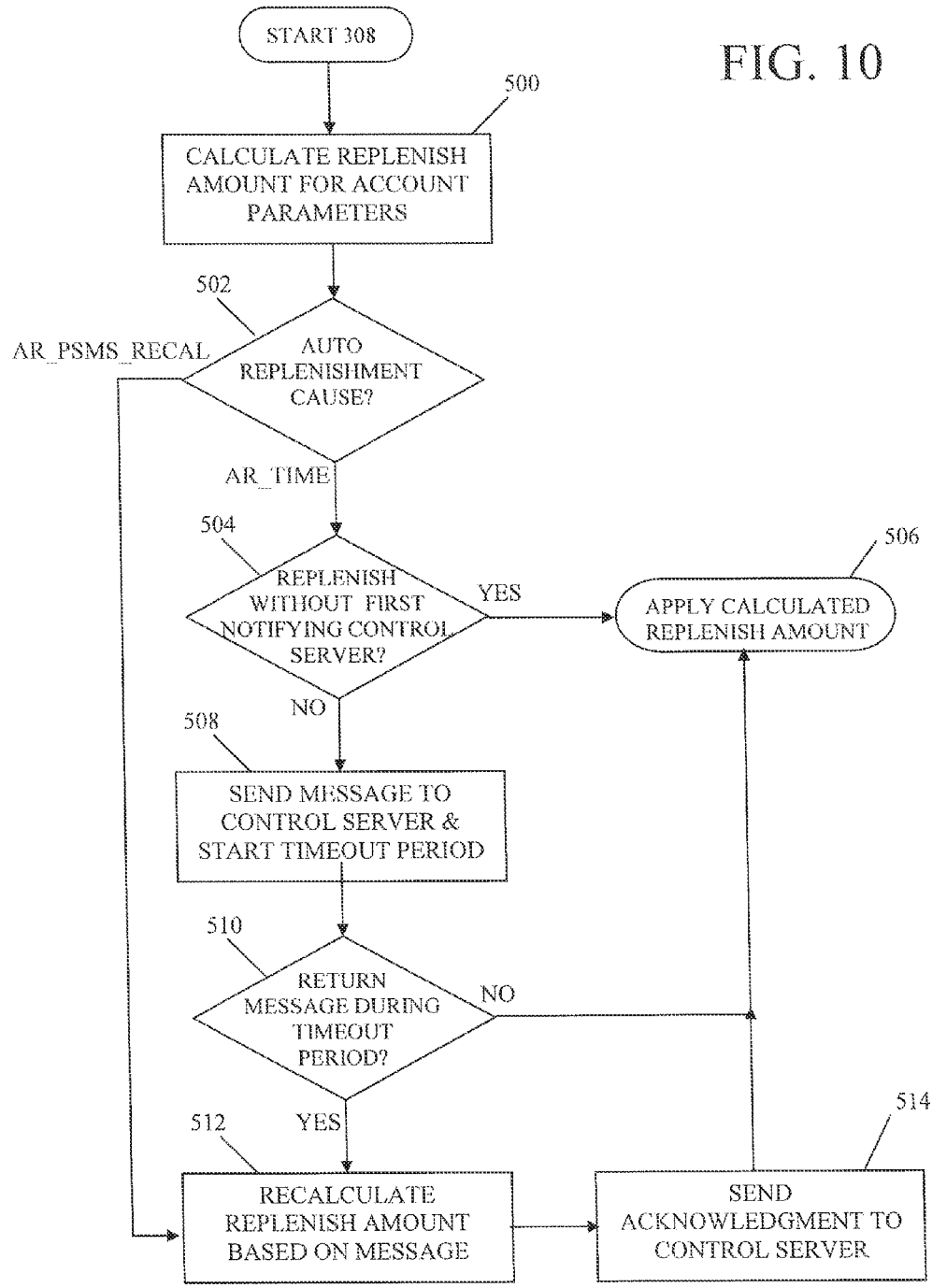

DEVICE INITIATED REPLENISHMENT PROCEDURES FOR WIRELESS DEVICES

COPYRIGHT NOTICE

A portion of the disclosure of this patent document contains materials that are subject to copyright protection. The copyright owner has no objection to the facsimile reproduction by anyone of the patent document or the patent disclosure, as it appears in the Patent and Trademark Office file or records, but otherwise reserves all copyright rights whatsoever.

TECHNICAL FIELD

The invention relates generally to the replenishment of account usage parameters internally stored within a wireless device and, more particularly, to the replenishment of internally stored account usage parameters using replenishment procedures initiated by the wireless device.

BACKGROUND

Prepaid wireless service (e.g., cellular service) is a form of wireless service in which a user must pay in advance for use of the wireless service. Typically, a user purchases from a prepaid wireless service provider a definite amount of usage of a wireless network (e.g., number of airtime minutes, amount of data transfer, number of messages) at an initially pre-defined exchange of monetary value versus units of usage. These measures of units of usage have commonly been valued as minutes of usage of the wireless network in the case of airtime minutes. When the user places or receives a call from their wireless device or otherwise uses the service, the user's pre-purchased airtime minutes or other appropriate units of usage are deducted from the user's account. The rate at which pre-purchased units of usage are deducted per unit of usage is known as the deduct rate. Once the pre-purchased units of usage have been exhausted, the user is denied service until the user purchases additional units or the user's account parameters are otherwise replenished.

Certain prepaid wireless devices possess internal accounting capabilities that allow for real-time call debiting of account parameters that are solely maintained within the wireless device, where such wireless devices include an internal memory which stores the deduct rate and a billing algorithm that monitors usage of the wireless device and debits the internally stored account parameters accordingly. In this manner, all accounting operations associated with use of the wireless device are performed within the wireless device itself, as opposed to traditional cell phone billing platforms in which accounts are managed, tracked and billed by components on the network side of the wireless network. Performing all accounting operations on the wireless device itself minimizes the communication traffic required between the wireless service provider's host processer that handles billing operations and the wireless device or other network components, thus reducing network traffic and congestion and expanding the overall traffic handling capacity of the wireless network.

Once prepaid units of usage have been exhausted on a prepaid wireless device possessing internal accounting capabilities, the wireless device becomes inoperable for such usage until the user's internal account is replenished with additional units of usage. This has traditionally required individualized replenishment messages to be generated and transmitted to each specific prepaid wireless device in order for a wireless service provider to replenish prepaid units of usage or to update the deduct rate or other account parameters.

Prepaid wireless devices having internal accounting capabilities and account and subscription parameters maintained solely within the wireless device can be especially useful for a Mobile Virtual Network Operator (MVNO), which is an operator that buys bulk airtime from Mobile Network Operators (MNO's) and provides subscription services to customers. A MNO is an operator that owns the network infrastructure, airwaves, and provides airtime to subscribers, or sells bulk airtime to other entities. A MVNO does not generally own any network infrastructure or airwaves.

Instead, in order to provide subscription services, MVNO's tend to incorporate a loosely coupled subscription model, wherein they rely on infrastructure outside the domain of the MNO's to provide various subscription parameters. A loosely coupled subscription model is a system wherein the wireless device (i.e., handset or subscriber unit) does not have a provisioning model based off the network infrastructure of the MNO (e.g., the switch).

A MVNO based loosely coupled model for provisioning handset parameters utilizing a MNO network is illustrated in FIG. 1. The MVNO configuration 10 could deploy one or more MVNO secure message generating servers (PSMS) 14 that rely on information provided by the MVNO provisioning server or control server 12. Should a wireless device 24 be always powered on and registered to the MNO network, the MVNO message generating server 14 sends a formatted Short Message Service (SMS) message to the wireless device 24 via a base transceiver station (BTS) or cell site 20, and the wireless device 24 replies with an acknowledgement, thereby completing a transaction. The formatted SMS message is routed via a Short Message Service Center (SMSC) 16, residing in the MNO broadcast region 22, and the SMSC 16 delivers the message to the wireless device 24, should it be notified by a Home Location Register (HLR) 18 indicating that the wireless device 24 is registered to the network. The wireless device 24, upon receipt of the SMS message and replenishment of its subscription parameters, sends a reply back to the MVNO provisioning server 12, thereby completing a transaction.

The complexity of this server-initiated replenishment operation is illustrated in FIG. 2 that illustrates an end to end sequence diagram for a server-initiated replenishment model for a MVNO. During a replenishment cycle, the MVNO provisioning server 12 computes the replenishment value for every wireless device 24 (if there are groups of wireless devices 24 to be replenished, then this computation must be performed for each wireless device). The MVNO provisioning server 12 then sends the calculated replenishment to the MVNO message generating server 14, which generates an SMS message and sends it to the SMSC 16. The SMSC 16 checks with the HLR 18 to determine whether the wireless device 24 has registered to the network and is powered on. If so, the SMS message is forwarded to the wireless device 24, which replenishes its parameters based on contents of the SMS message. The wireless device 24 then sends an acknowledgement back to the MVNO provisioning server 12, thereby completing the process This operation involves a pseudosynchronous operation that requires the wireless device 24 to be powered on most of the time in order to receive the replenishment message, and recovers should the wireless device 24 have power cut during the operation or other temporary system backlogs. However, there are times when a wireless device 24 can be switched off for extended periods of time, and may not be used for days, weeks or even months. This model of handset usage does not lend itself to a model where a thorough two-way synchronization between the back-end MVNO provisioning server 12 and the wireless device 24 can take place when the wireless device 24 has been turned off. If a wireless device 24 is switched off for a long duration of time, the replenishment message could time out at the SMSC 16 or the MVNO provisioning server 12 could time out, such that the desired replenishment does not occur. Compounding this problem, if multiple wireless devices 24 are turned off, the network elements (e.g., MVNO provisioning server 12, SMSC 16) can become backlogged with messages, causing a vast amount of messages either to become expired on the back-end of the MVNO (e.g., MVNO provisioning servers 12) or the back-end of the MNO's (e.g., SMSC's 16), respectively, leading to the subscriber not having a timely allocation of airtime or other usage replenished on their wireless device 24.

Even when wireless devices 24 are powered on, another problem with this server-initiated replenishment approach is that it can cause network elements to become backlogged when a large number of wireless devices 24 have their account parameters replenished on a periodic basis (e.g., monthly), such that a replenishment message is sent to each wireless device 24 at the beginning of period. For example, if a wireless service provider needed to replenish account parameters or update account settings for a large number of wireless devices 24 at the same time (e.g., 500,000 users), this would require 500,000 individual messages to be generated and transmitted to each of the 500,000 wireless devices 24. These large numbers of individualized messages provide a tremendous burden on the service provider to create the individual messages and also create severe congestion on the network elements (e.g., MVNO provisioning server 12, SMSC 16, etc.) and the wireless network itself to deliver such a large number of individual messages at substantially the same time at the beginning of a replenishment period.

SUMMARY

In one or more aspects, a method, device and system are provided for wireless device-initiated automatic replenishment of internally-stored account parameters associated with an amount of authorization for usage of the wireless device (e.g., prepaid amount of airtime minutes, data usage, messages, etc.). Upon determining within the wireless device that the account parameter(s) should be replenished, the wireless device transmits a message to a control server indicating that the wireless device intends to perform the determined replenishment according to the replenishment parameters stored within the wireless device. In one or more aspects, the wireless device delays performance of the replenishment for a predetermined period of time to determine whether the control server provides a response containing updated replenishment parameters. Depending upon whether the wireless device receives a response from the control server during the time period, the wireless device then replenishes the internally-stored account parameter(s) using either the previously stored replenishment parameters or the updated replenishment parameters. If the response is not received within the predetermined amount of time, replenishment is performed according to the replenishment parameters previously stored in the wireless device, whereas if the response is received from the control server within the predetermined amount of time, replenishment is performed according to the updated replenishment parameters contained in the response.

In one or more aspects, the wireless device determines whether the internally-stored account parameter(s) should be replenished at a predetermined time according to a secure timestamp available within the wireless device. In one or more aspects, the wireless device further detects whether tampering with the secure timestamp has occurred, where upon detection of tampering with the secure timestamp, the wireless device takes certain security measures, such as preventing replenishment of the internally-stored account parameter from occurring and/or notifying the control server that tampering with the secure timestamp has been detected.

In one or more aspects, the stored replenishment parameters include a predetermined number of replenishments of at least one internally-stored account parameter that can be performed, such that when determining whether the internally-stored account parameter(s) should be replenished, a determination is made whether the predetermined number of replenishments have already been performed and replenishment of the internally-stored account parameter(s) is prevented once the predetermined number of replenishments have already been performed.

In one or more aspects, the internally-stored account parameters being replenished may include any entity in units that is metered by the wireless device to keep track of an account subscription, ability to originate or receive calls or other communications, send or receive messages (e.g., SMS/MMS/USSD), perform data transfer, be registered to or use a network, or other subscription services. In one or more aspects, the subscription units may refer to a denomination in time (e.g., minutes), messages, currency amount or any other parameter a wireless device employs to provide a wireless device based subscription.

In one or more aspects, a method, device and system are provided for wireless device-initiated automatic replenishment of internally-stored account parameters associated with an amount of authorization for usage of the wireless device for an interval-based usage subscription that reduces replenishment message congestion on the network elements and also ensures that replenishment procedures are implemented when required by wireless devices, even in situations where wireless devices are powered off for extended periods of time.

DRAWINGS

The above-mentioned features of the disclosure will become more apparent with reference to the following description taken in conjunction with the accompanying drawings wherein like reference numerals denote like elements and in which:

FIG. 10 is an operational flow diagram of the auto replenish update process of FIG. 8 performed in accordance with one or more aspects of the disclosure.

DETAILED DESCRIPTION

In the description that follows, the various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

Reference in this specification to "one aspect," "an aspect," "other aspects," "one or more aspects" or the like means that a particular feature, structure, or characteristic described in connection with the embodiment is included in at least one embodiment of the disclosure. The appearances of, for example, the phrases "in one aspect" or "in one or more aspects" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

The word "exemplary" is used herein to mean "serving as an example, instance, or illustration." Any implementation described herein as "exemplary" is not necessarily to be construed as preferred or advantageous over other implementations.

As used herein, the term "wireless device" is intended to encompass any mobile technology computing device that connects to a wireless communication network and may or may not utilize a UICC/SIM card, such as mobile phones, cellular phones, smartphones or the like (e.g., Apple iPhone®, Google Android™, BlackBerry®, other type of PDA or smartphone), tablets (e.g., Tablet PC, iPad®, iPod Touch, etc.), wireless dongles, or other mobile computing devices. The term "wireless device" may be interchangeably used and referred to herein as "wireless handset," "handset," "mobile device," "device," or "phone." Further, reference herein to a "wireless network" or "network" is intended to encompass any type of wireless network from which a wireless carrier or mobile virtual network operator (MVNO) provides wireless services to a wireless device, such as but not limited to a cellular data network (e.g., Global System for Mobile Communication (GSM), CDMA, UMTS, EVDO, LTE or the like) or a wireless wide area network (e.g., WiFi, WiMax).

Figure 1:
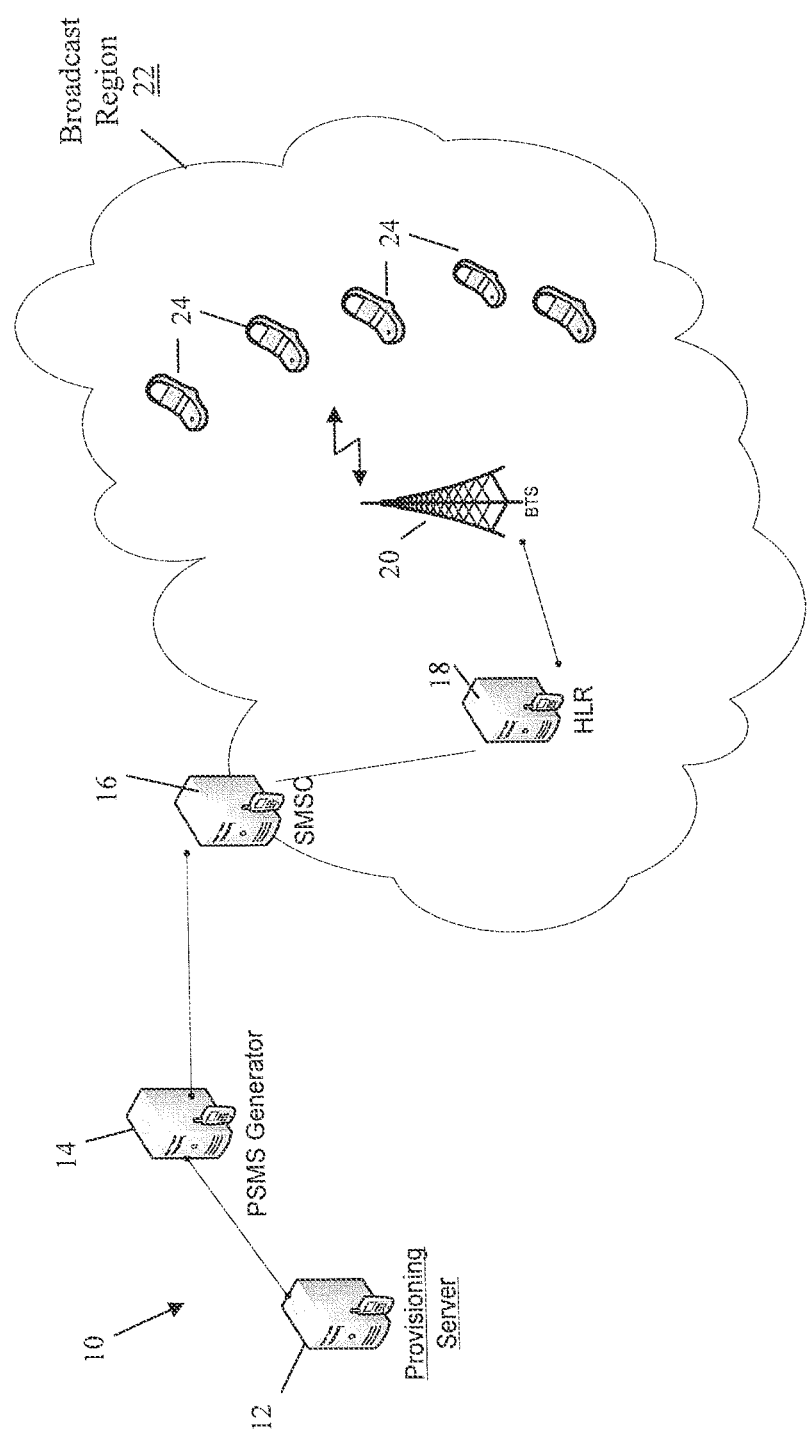
FIG. 1 is a schematic block system diagram of a MVNO-based loosely coupled model for provisioning handset parameters utilizing a MNO network as utilized by one or more aspects of the disclosure.
Figure 2:
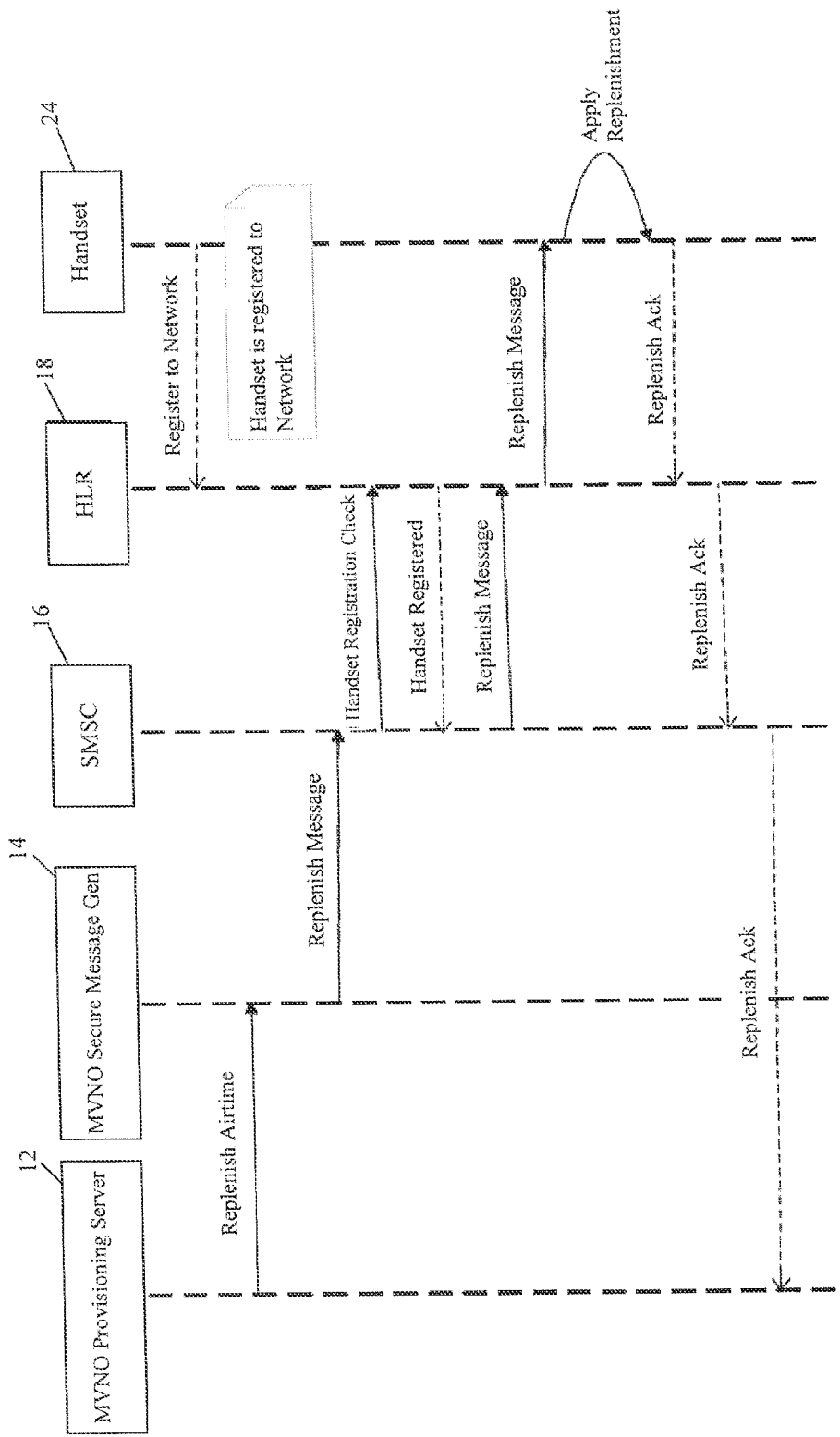
FIG. 2 is an end to end sequence diagram for a server-initiated replenishment model for a MVNO.
Figure 3:
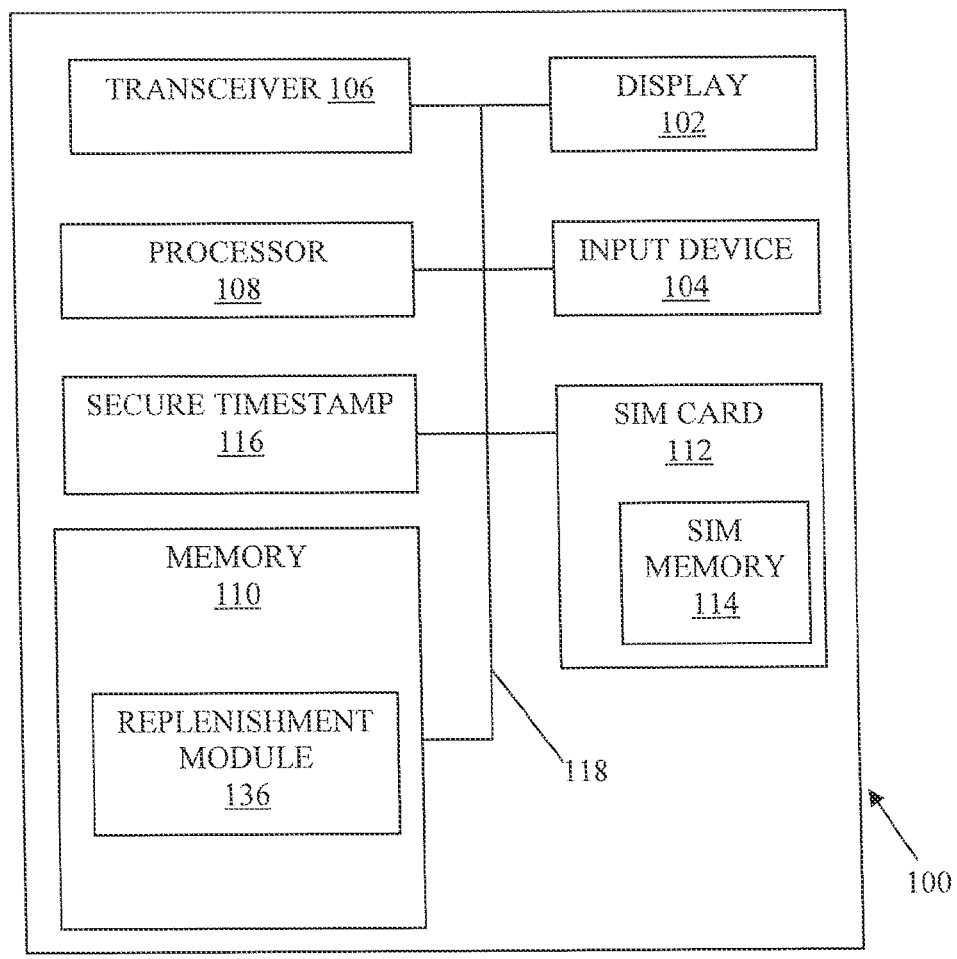
FIG. 3 is a schematic diagram of a wireless device architecture in accordance with one or more aspects of the disclosure.

FIG. 3 is a schematic diagram of a wireless device architecture in accordance with one or more aspects of the disclosure. In particular, FIG. 3 is a schematic block diagram of a wireless device 100 in accordance with one or more aspects of the disclosure. In one or more aspects, the wireless device 100 may include a display 102, an input device 104, a transceiver 106, a processor 108, and a memory 110. In some aspects, the wireless device may include a UICC/SIM card 112. In one or more aspects, the SIM card 112 may be removably received within a card slot (not shown) in wireless device 100 and may include its own internal SIM memory 114. Memory 110 may include, for example, random access memory ("RAM") or read only memory ("ROM"), while RAM may be volatile or non-volatile RAM. Other aspects may not include a SIM card 112. In one or more aspects, wireless device 100 includes a secure timestamp 116 that may be obtained from any number of possible sources, including Network Identify and Time Zone (NITZ) where the time is sent to the wireless device 100 from a subscribed public land mobile network (PLMN) or a synchronization with a remote atomic clock, which are stored in memory 110. In one or more aspects, the secure timestamp 116 may be obtained from a handset-based secure timestamp circuit or any other manner of maintaining a secure timestamp as known to those skilled in the art. These various components within wireless device 100 are coupled to communicate data with one another, such as through an internal bus 118 or other connectors.

Figure 4:
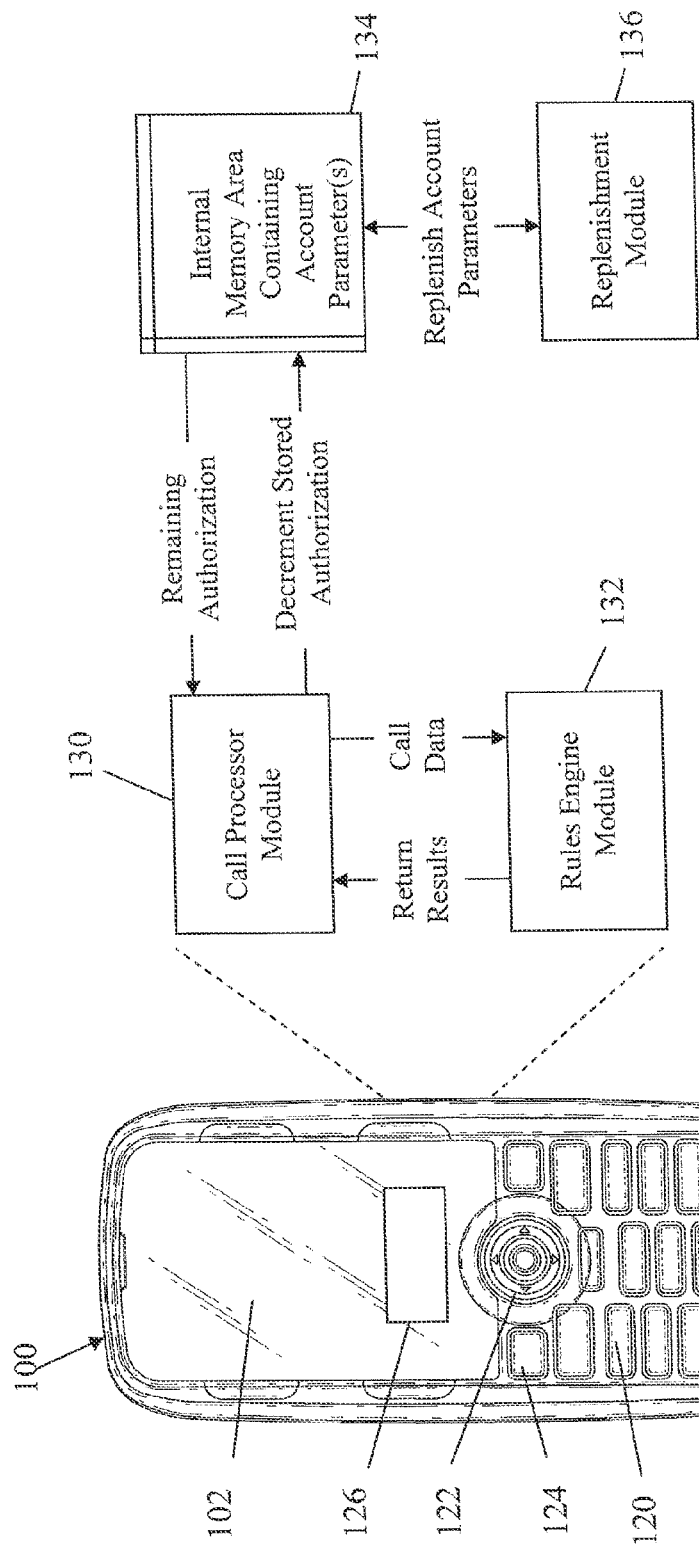
FIG. 4 is a schematic block diagram of a wireless device including certain programmed software modules in accordance with one or more aspects of the disclosure.

In one exemplary embodiment, wireless device 100 may include a mobile phone, as illustrated in FIG. 4, in which display 102 may include a screen display and the input device 104 may include any one or combination of a keypad 120, track ball 122, selectable buttons 124, a touch screen 126 having selectable icons, a speaker (not shown) for generating sounds and/or a microphone (not shown) for receiving voice inputs. The wireless device 100 includes an antenna coupled to transceiver 106 to facilitate the transmission and receipt of data, messages and communications by wireless device 100.

Although for the sake of clarity and simplicity, an exemplary embodiment of the invention is described in terms of a prepaid wireless device 100 used in a prepaid mobile communications system in which account parameters for usage of the wireless device 100 are stored, tracked, deducted and updated solely internally within the wireless device 100 itself, it should be understood that the invention is not limited to this exemplary embodiment. Alternative aspects of the invention may include any mobile communications device with internally stored rules of operation and internally stored account parameters that require replenishment after depletion of such account parameters in order to continue usage of the mobile communications device.

In one or more aspects, the internally-stored account parameters being replenished may include any entity in units that is metered and tracked by the wireless device 100 to keep track of an account subscription, ability to originate or receive calls or other communications, number of airtime minutes, ability to send or receive messages or number of messages (e.g., SMS/MMS/USSD), amount or volume or other ability of data transfer or other circuit switched or packet switched data transmission, ability to be registered to or use a network, communication rate, number of communications or any other type of communication, data transfer or subscription services available for use by wireless device 100 that may be metered. In one or more aspects, the subscription units may refer to a denomination in time (e.g., minutes), messages, currency amount or any other parameter the wireless device 100 employs to provide a handset based subscription.

In one or more aspects, software, processor-executable instructions and software architectures may be described in terms of certain software modules. For the purposes of this disclosure, a module is a software, hardware, or firmware (or combinations thereof) system, process or functionality, or component thereof, that performs or facilitates the processes, features, and/or functions described herein (with or without human interaction or augmentation). It should be understood that where a plurality of software modules are described, the functions performed by the plurality of software modules may alternatively be performed by a single software module. Similarly, where a single software module is described, the functions performed by the single software module may alternatively be performed by a plurality of software modules.

Wireless device 100 contains embedded software including modules, programs, processor-executable instructions and/or data stored internally in memory 110 (or SIM memory 114). In the exemplary embodiment for a prepaid wireless device 100 in which all accounting functionality is performed within the wireless device 100, internally stored account parameters (e.g., a prepaid amount of authorization for usage of the wireless device 100 or wireless network or other subscription units), are also stored internally in memory 110 (or SIM memory 114).

The embedded software instructs prepaid wireless device 100 how to handle incoming and outgoing communications (e.g., voice call, messages, data transfers, etc.), determines an appropriate deduct rate to apply against the communication, meters the communication, and applies the deduct rate against the metered communication to determine a value to be deducted from the stored prepaid amount of authorization for usage of wireless device 100. The stored prepaid amount of authorization is then updated in memory 110 (or SIM memory 114) of wireless device 10. For example, the embedded software inside the prepaid wireless device 100 deducts prepaid airtime units credit upon usage of wireless device 100. If the user's prepaid airtime units credit is exhausted, the prepaid wireless device 100 may lock itself, denying further use of wireless device 100 until additional prepaid airtime credits are replenished or otherwise provided to wireless device 100 (e.g., a recurring prepaid replenishment that occurs on a periodic basis). In one or more aspects, all accounting operations associated with use of wireless device 100 are performed within wireless device 100, which assists in reducing network traffic and congestion and expanding the overall traffic handling capacity of the associated wireless network by minimizing the communication traffic required between the wireless service provider's host processer that handles billing operations and wireless device 100 or other network components.

FIG. 4 is a schematic block diagram of a wireless device including certain programmed software modules in accordance with one or more aspects of the disclosure. In particular, FIG. 4 further illustrates via block diagrams a software architecture embedded within memory 110 (or SIM memory 114) of wireless device 100 in accordance with one or more exemplary aspects of the disclosure. A call processor module 130 detects a triggering event such as, for example, an inbound or outbound call (or message or data transfer or other event). The call processor module 130 obtains certain data about the triggering event such as, for example, the telephone number associated with the call. The call processor module 130 then calls a rules engine module 132 to determine the appropriate deduct rate to apply against at least one stored account parameter 134 or stored amount of usage authorization (e.g., available airtime units credit). The deduct rate is the time rate at which air time units credit or other amount of authorization for usage of wireless device 100 is deducted associated with the communication.

Rules engine module 132 applies rules stored in internal memory 110 (or SIM memory 114) to the communication information or call data received by the call processor module 130. Based on the communication information or call data, the rules engine module 132 determines the appropriate deduct rate to apply against the communication. Rules engine module 132 returns the resulting information to the call processor module 130. Based on these results, the call processor module 130 either allows or prohibits the communication, and if the communication is allowed, applies the correct deduct rate and deducts from the stored account parameters 134 until the communication is ended or the stored account parameters 134 are exhausted. One manner of programming a wireless device 100 to possess such internal accounting functionality is described in U.S. Pat. No. 7,444,141, issued on Oct. 28, 2008 and entitled, "Method and System for Programming Control of Mobile Communication Units," the contents of which are incorporated by reference herein in its entirety.

The wireless device 100 further includes a replenishment module 136 configured for replenishing the internally-stored account parameters 134 within wireless device 100 in accordance with one or more aspects. Replenishment module 136 determines a need or indication to replenish the internally-stored account parameters 134 (e.g., a prepaid amount of authorization for usage of one or more aspects of wireless device 100 or the wireless network). In one or more aspects, replenishment module 136 determines whether the internally-stored account parameter(s) 134 should be replenished at a predetermined time according to a secure timestamp 116 available within wireless device 100. In one or more aspects, replenishment module 136 determines whether the internally-stored account parameter(s) 134 should be replenished at a predetermined time periodically for an interval-based usage subscription.

Figure 5:
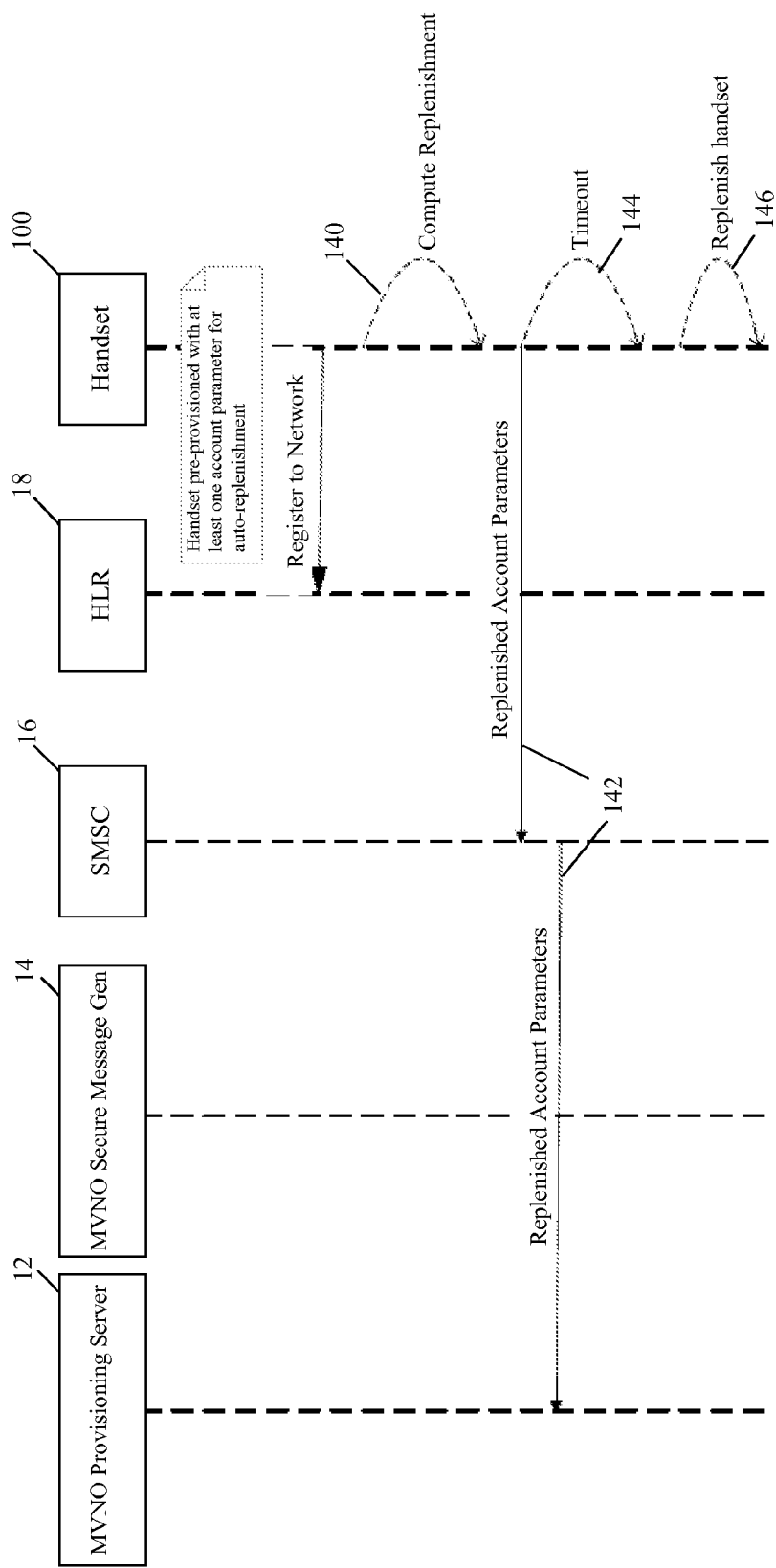
FIG. 5 is an end to end sequence diagram for the overall system operation for a handset-initiated replenishment of account parameters in accordance with one or more aspects of the disclosure.

FIG. 5 is an end to end sequence diagram for the overall system operation for a handset-initiated replenishment of account parameters in accordance with one or more aspects of the disclosure. In particular, FIG. 5 shows an end to end sequence diagram is illustrated for the overall system operation for the handset-initiated replenishment of account parameters implemented by replenishment module 136 in accordance with one or more aspects. Upon power-up or entry in a wireless network coverage region 22, wireless device 100 registers with a HLR 18 in accordance with conventional practices known to those skilled in the art. When the wireless device 100 has the replenishment module 136 installed therein and is provisioned with at least one account parameter for auto-replenishment, the replenishment module 136 determines when the internally-stored account parameters 134 should be automatically replenished (e.g., replenished on a periodic interval, such as monthly or otherwise, where a replenishment date for the interval is triggered using the secure timestamp 116 available within wireless device 100). Replenishment module 136 further computes an amount of replenishment of at least one internally-stored account parameter in operation 140 according to replenishment parameters or rules previously stored in the wireless device 100, such as within replenishment module 136 or rules engine module 132 or elsewhere within the wireless device 100.

In one or more aspects, replenishment module 136 then causes the wireless device 100 to transmit a message to the MVNO back-end control server 12 in operation 142 indicating that the replenishment module 136 intends to perform the computed replenishment according to the replenishment parameters or rules previously stored in the wireless device 100. The message transmitted from the wireless device 100 to the control server 12 (and other communications between the wireless device 100 and the control server 12) may be sent on one or a multitude of data bearers or formats, including but not limited to SMS, USSD, IP datagram, etc. In one or more aspects, all communications between the wireless device 100 and the control server 12 may be encrypted and/or encoded to ensure secure communications between the components.

In one or more aspects, replenishment module 136 delays performance of the replenishment for a predetermined period of time 144 (e.g., timeout period) to determine whether the control server 12 provides a response containing updated or different replenishment parameters for the replenishment module 136 to utilize when replenishing the internally-stored account parameter(s) 134. Depending upon whether the wireless device 100 receives a response from the control server 12 during the timeout period 144, the replenishment module 136 then replenishes the internally-stored account parameter(s) 134 in operation 146 using either the previously-stored replenishment parameters or the updated replenishment parameters. For example, if no response was received by the wireless device 100 within the timeout period 144, as illustrated in FIG. 5, replenishment is performed according to the replenishment parameters or rules previously stored in the wireless device 100. If a response is received from the control server 12 within the timeout period 144 (not shown in FIG. 5), replenishment is performed according to the updated replenishment parameters that are contained in the response message received from the control server 12.

In one or more aspects, the response received from the control server 12 may provide a one-time modification of the replenishment of internally stored account parameters (e.g., a prepaid amount of authorization for usage of the wireless network) or may provide an update or modification to internally stored rules within the wireless device 100 for the periodic replenishment of internally-stored account parameters going forward or for a certain period of time.

In one or more aspects, the wireless device 100 may be provisioned with one or more of the account parameters in Table I below that may be used by the wireless device 100 during the auto replenish process:

TABLE I

| | |
|---|---|
| Plan Start Date | This represents the calendar date that a recurring plan starts on. |
| Plan End Date | This represents the calendar date that a recurring plan ends on. The Plan End Date must be greater than the Plan Start Date for any replenishment to occur. |
| Replenishment Amount | This represents the amount of subscription usage parameters that the handset replenishes with. |
| Replenishment Date | This represents the date on which the replenishment occurs. In one or more aspects, to discount leap year and other time zone related variances, the replenish date range is between 2-27 inclusive. |
| Replenishment Timeout | This represents the timeout period 144 that a handset waits prior to replenishing itself. In one or more aspects, this may be used only rare instances for the system to correct itself where a subscription parameter changed, where this may be an optional parameter that can be enabled by the back-end. |
| AR Enable | This is a flag that is provisioned on the handset to indicate if auto replenishment is enabled. If set to TRUE, the handset performs replenishment, and if set to FALSE, the handset does not perform replenishment. |

Referring now to FIGS. 6-10, operation flow diagrams of the various aspects of the handset initiated auto replenish process performed by the replenishment module 136 in accordance with one or more aspectsare illustrated. The following terminology used in these operational flow diagrams is further defined as set forth in Table II below:

TABLE II

| | |
|---|---|
| PSMS | A coded message (e.g. Short Message Service (SMS)) sent from/to the handset to/from the back-end. This may contain either status messages, or information on replenished/replenishment parameters. |
| AR_CAUSE | Auto Replenishment Cause. This is an enumeration of AR_TIME (Auto replenishment based on a secure timestamp), AR_PSMS_RECAL (Auto replenishment based on a recalibration message received during the Replenishment Timeout period 144), AR_UNKNOWN (Auto Replenishment outside the timeout 144 and secure timestamp periods). |
| Pending Replenishment Date | The pending date value when the replenishment is to occur. |
| Last Auto Replenish Date | The last time the replenishment occurred. Should the handset not have replenished, this would equal to the Plan Start Date. |
| Replenishment Count | The number of times that the handset has previously replenished. |
| End of Service Date | The last date the handset is provisioned to be registered on the network. At a date after the end of service date, the handset will no longer register to the network. |
| Subscription Units | The subscription units represent a denomination in minutes, currency amount, or any other parameter that a handset employs to provide a handset-based subscription for usage of the handset or a network. |
| Time-Tank Balance | This represents the subscription units provisioned and remaining on the handset. |
| Pending Time Tank Balance | This is the computed subscription units that need to be replenished on the handset. |
| TIME | Secure Timestamp maintained on the handset. The secure timestamp can be obtained from a variety of sources, namely NITZ, a secure clock on a remote server, or a handset maintained integrated circuit that maintains a tamper proof secure time. |
| PVIEW | Fragment of messages sent from/to the handset to/from the backend. |

Figure 6:
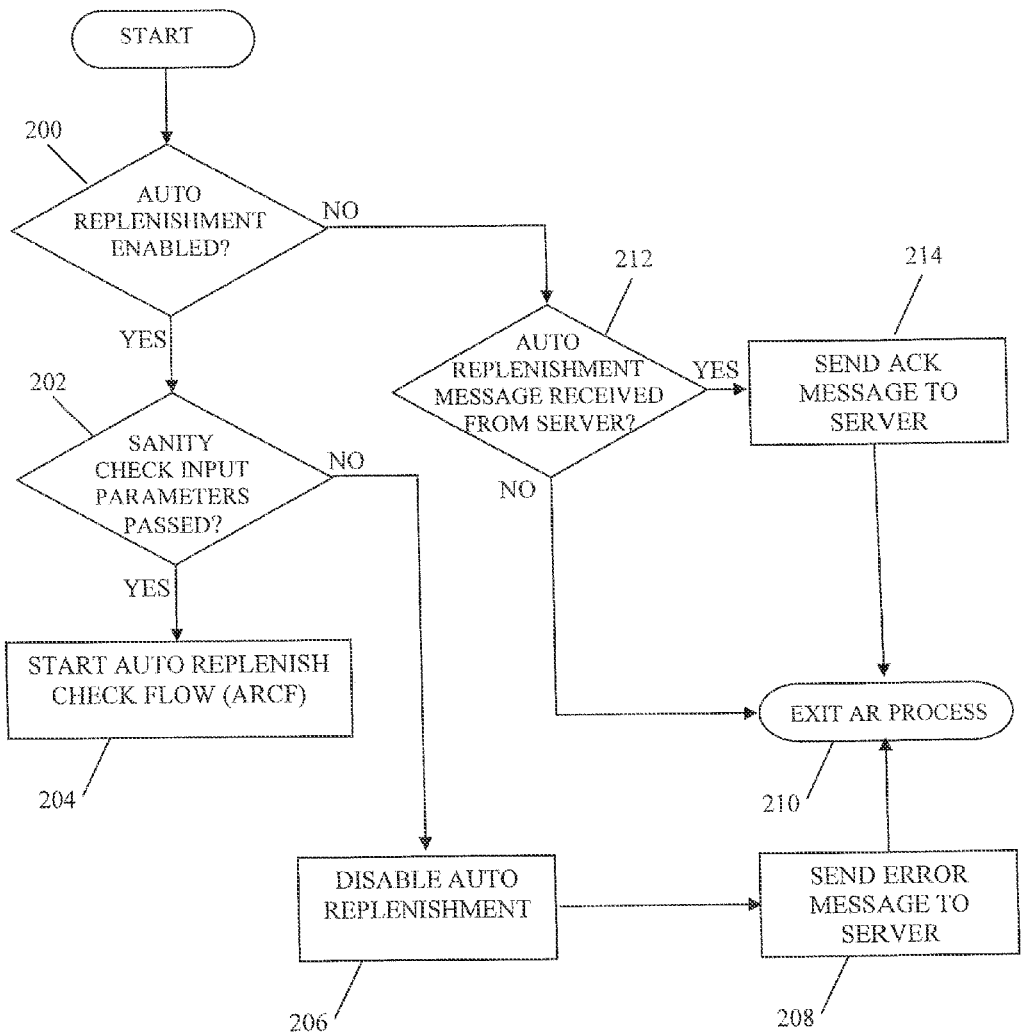
FIG. 6 is an operational flow diagram of a handset-initiated auto replenish process performed in accordance with one or more aspects of the disclosure.

Referring now to FIG. 6, an operational flow diagram of the handset initiated auto replenish process performed by the replenishment module 136 in accordance with one or more aspects is illustrated. Upon power-up of the wireless device 100 or other initiation of the auto replenish process, the replenishment module 136 will determine whether auto replenishment functionality is enabled on the wireless device 100 in operation 200. For example, the replenishment module 136 may determine whether the AR Enable flag has been set to TRUE. In one or more aspects, the cause or reason for the initiation of the auto replenishment process (i.e., Auto Replenishment Cause) may be based on an auto replenishment determination made according to the secure timestamp 116 (e.g., AR_TIME), an auto replenishment determination made according to a recalculation/recalibration message received from the control server 12 during the timeout period 144 (e.g., AR_PSMS_RECAL), or another auto replenishment determination made outside of the timeout period 144 and secure timestamp periods (e.g., AR_UNKNOWN). If auto replenishment has been enabled on the wireless device 100, the replenishment module 136 will perform a sanity check on the input account parameters (e.g., Start Date, End Date, Replenish Date, AR Enable, Replenish Duration, End of Service Date, etc.) in operation 202 (as further described in greater detail in FIG. 7 in accordance with one more aspects) to determine whether the account parameters satisfy conditions for auto replenishment. If the sanity check of the account parameters is passed, the auto replenish check flow process is started in operation 204, as will be described in greater detail in connection with FIG. 8 in accordance with one or more aspects. If the sanity check performed in operation 202 fails, auto replenishment is disabled in operation 206 and the replenishment module 136 causes an error message containing information related to the failed sanity check to be communicated to the control server 12 in operation 208, where the auto replenish process is then exited in operation 210.

If auto replenishment has not been enabled on the wireless device 100, the replenishment module 136 will determine in operation 212 whether the cause or reason for the initiation of the auto replenishment process was based on a message received by the wireless device 100 from the control server 12 (e.g., AR_PSMS_RECAL message). If not, the auto replenish process is then exited in operation 210. If so, the replenishment module 136 recalibrates the stored account parameters based on the contents of the received message and communicates an acknowledgement message back to the control server 12 in operation 214 upon the completion of such. The auto replenish process is then exited in operation 210

Figure 7:
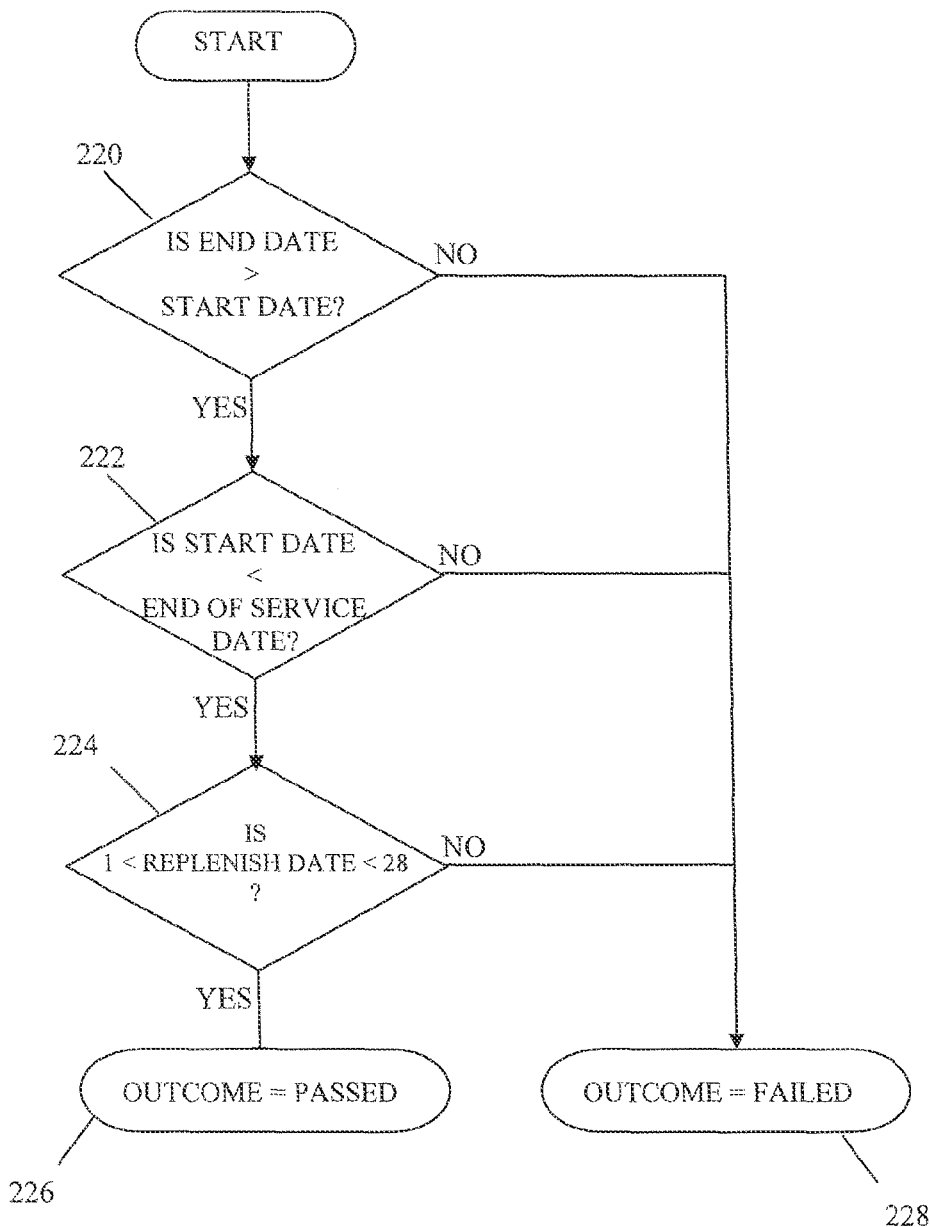
FIG. 7 is an operational flow diagram of the sanity check operation of the handset-initiated auto replenish process performed in accordance with one or more aspects of the disclosure.

Referring now to FIG. 7, a more detailed operational flow diagram of the sanity check operation 202 of FIG. 6 is illustrated in accordance with one or more aspects. The replenishment module 136 will first ensure that the calendar date for the Plan End Date for the recurring replenishment plan is later than the calendar date for the Plan Start Date for the recurring replenishment plan in operation 220. The Plan End Date must be greater than the Plan Start Date for any replenishment to occur, where the sanity check fails (operation 228) if this situation does not exist. If the Plan End Date>Plan Start Date, the replenishment module 136 will next determine whether the calendar date of the Plan Start Date is before or earlier than the End of Service Date in operation 222. Since the End of Service Date is the last date that the wireless device 100 is provisioned to be registered on the network, the sanity check fails if the Plan Start Date is later than the End of Service Date. As long as the Plan Start Date is before or earlier than the End of Service Date, the replenishment module 136 may optionally determine in operation 224 whether the Replenishment Date falls on a day in the range 2-27 (e.g., 1<Replenishment Date<28), in order to account for leap years and other time zone related variances that may exist. As long as the day of the Replenishment Date falls within this range, the sanity check is passed (operation 226), where it otherwise fails if the date is greater than 27 or less than 2. The various operations performed in connection with the sanity check operation 202 are performed to ensure that the account parameters satisfy certain conditions that make the auto replenish procedure acceptable, where it is understood that some or all of these operations described in connection with FIG. 7 may be omitted or altered as appropriate or replaced or supplemented with other sanity check operations that may be desired.

Figure 8:
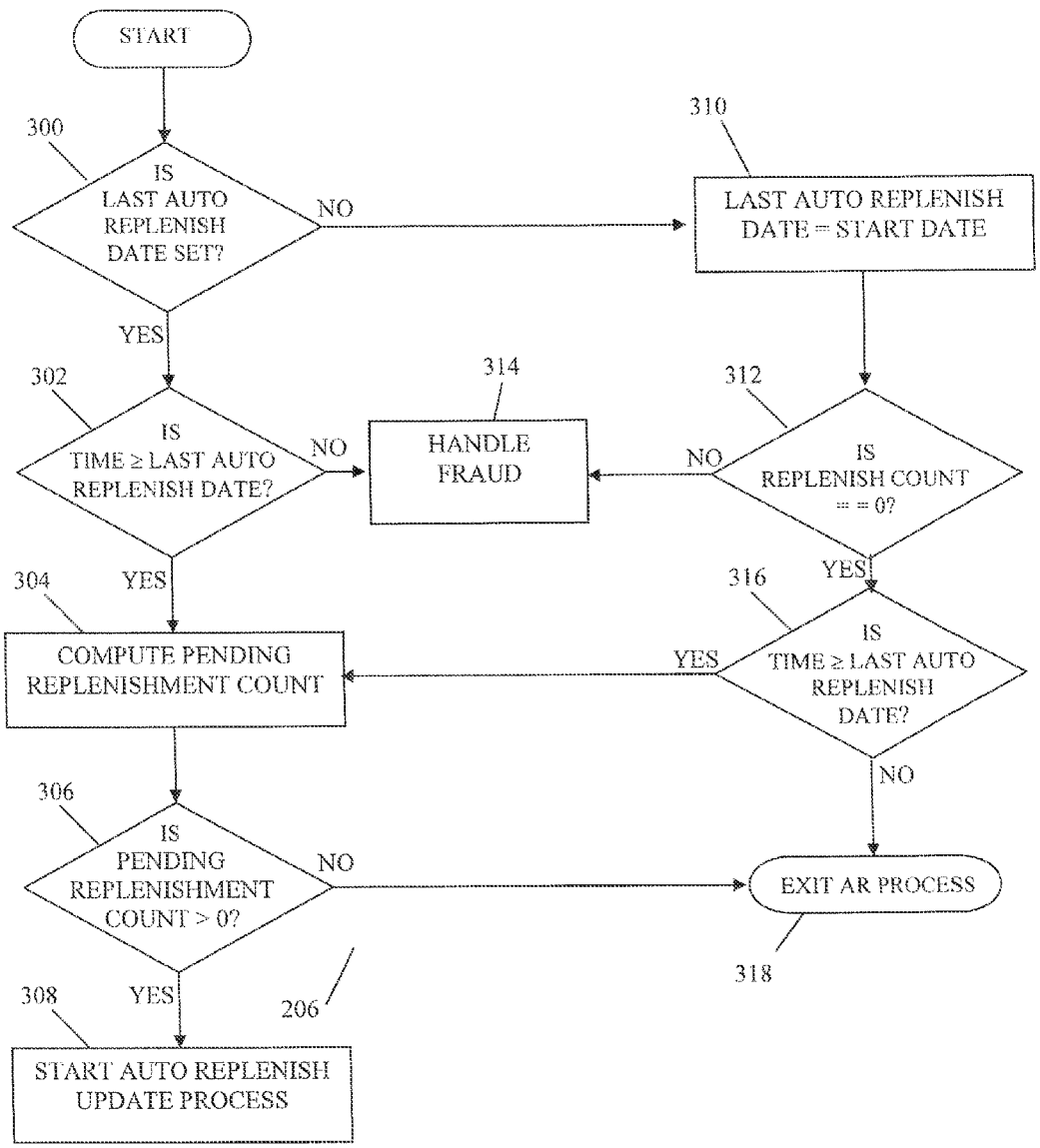
FIG. 8 is an operational flow diagram of the auto replenish check flow procedure of the handset-initiated auto replenish process performed in accordance with one or more aspects of the disclosure.

Referring now to FIG. 8, a more detailed operational flow diagram of the auto replenish check flow procedure 204 of FIG. 6 is illustrated in accordance with one or more aspects. The replenishment module 136 determines in operation 300 whether the Last Auto Replenish Date, which is the last calendar date that a replenishment occurred, has been set. If the account parameters for the wireless device 100 have not been previously replenished, then the Last Auto Replenish Date is set to equal the Plan Start Date in operation 310. For those wireless devices 100 that have not been previously replenished, the Replenishment Count (i.e., the number of times that the wireless device has been replenished) should equal zero, as determined in operation 312. If the Replenishment Count for such wireless devices 100 is not equal to zero, then fraud mechanisms or procedures are implemented in operation 314. When the Replenishment Count correctly equals zero for those wireless devices 100 that have not been previously replenished, the replenishment module 136 determines in operation 316 whether the Time, as provided by the secure timestamp 116 within the wireless device 100, is greater than or equal to the Last Auto Replenish Date (i.e., the Plan Start Date). If not, the recurring plan has not yet started and the auto replenish process is exited in operation 318. If the Time is greater than or equal to the Last Auto Replenish Date, then the Pending Replenishment Count is computed in operation 304 (as further described in greater detail in FIG. 9 in accordance with one more aspects), where the Pending Replenishment Count represents the number of replenishments that are pending to be made. In situations where a wireless device 100 has been powered off for an extended period of time, a number of recurring replenishments based on a recurring replenishment plan may be overdue and the Pending Replenishment Count may be greater than one. For example, for a wireless device 100 having a monthly subscription plan that has been powered off for several months, recurring replenishments for several months may be pending to be made.

In those situations where Last Auto Replenish Date has been set (i.e., there has been a prior replenishment), the replenishment module 136 determines in operation 302 whether the Time, as provided by the secure timestamp 116 within the wireless device 100, is greater than or equal to the Last Auto Replenish Date. If not, it is possible that secure timestamp 116 has been tampered with, and fraud mechanisms or procedures are implemented in operation 314. If the Time is greater than or equal to the Last Auto Replenish Date, then the Pending Replenishment Count is computed in operation 304 (again as further described in greater detail in FIG. 9 in accordance with one more aspects). The replenishment module 136 then determines in operation 306 whether the Pending Replenishment Count is greater than zero. If so, the replenishment module 136 starts the auto replenish update process 308, as further described in greater detail in FIG. 10 in accordance with one more aspects. If the Pending Replenishment Count is not greater than zero, the auto replenish process is exited in operation 318.

Figure 9:
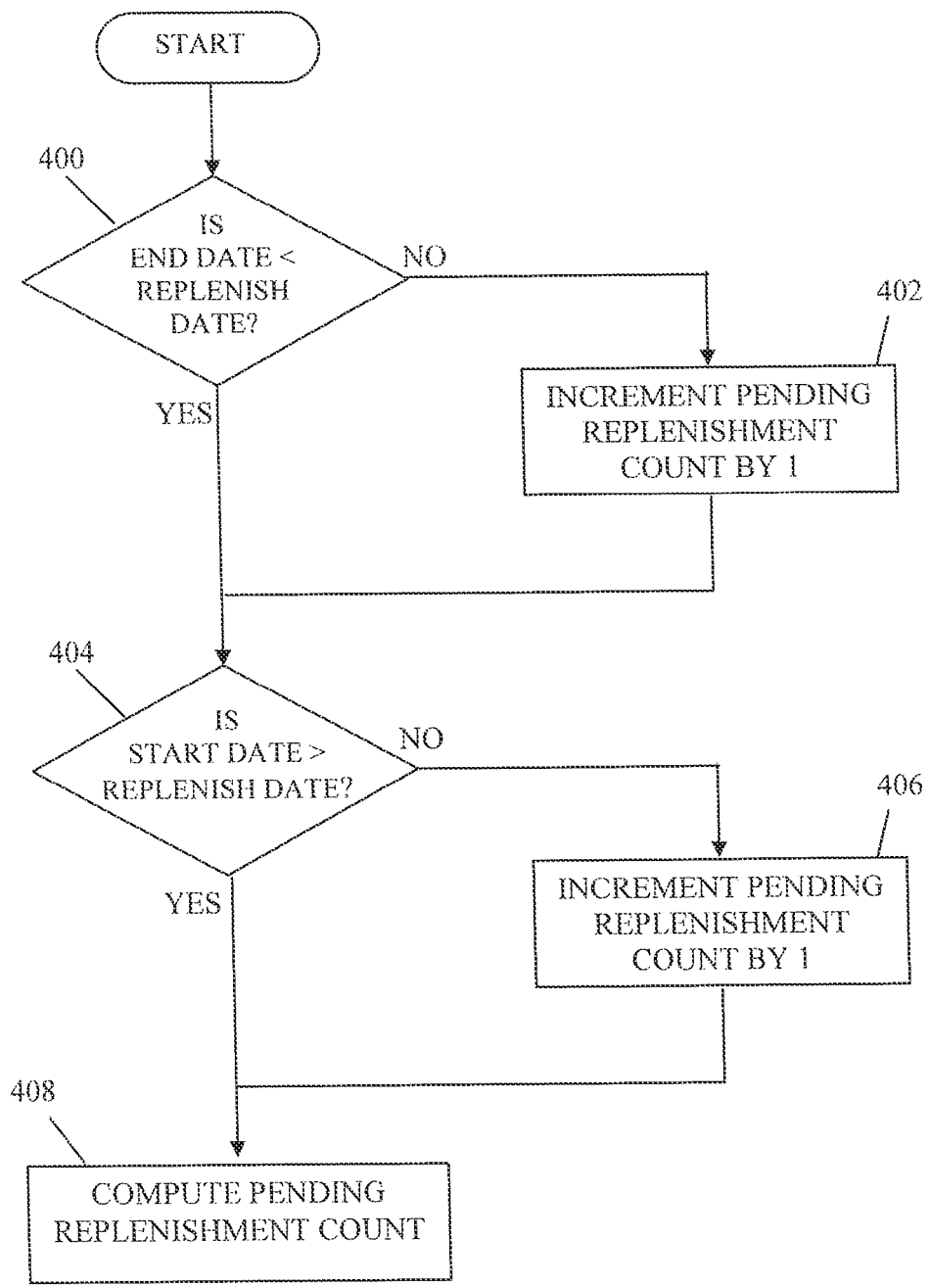
FIG. 9 is an operational flow diagram of the pending replenishment count computation of the handset-initiated auto replenish process performed in accordance with one or more aspects of the disclosure.

Referring now to FIG. 9, a more detailed operational flow diagram of the computation of the Pending Replenishment Count (i.e., number of replenishments in a recurring replenishment plan that are pending to be made) performed in operation 304 of FIG. 8 is illustrated in accordance with one or more aspects. The replenishment module 136 will utilize a variety of input account parameters to make this computation, such as the Plan Start Date, Plan End Date, Replenish Date, AR Enable, Replenish Duration, End of Service Date, and a Pending Replenishment Count initially set equal to zero to start the calculation. The replenishment module 136 determines in operation 400 whether the End Date is less than the Replenish Date, where Replenish Date represents the date on which the replenishment is to occur and the End Date is the earlier of the current date or the Plan End Date. If the Replenish Date is greater than the End Date, the Pending Replenishment Count is incremented by one in operation 402 (i.e., Pending Replenishment Count=Pending Replenishment Count+1), where the Pending Replenishment Count is not incremented if the Replenish Date is not greater than the End Date. The replenishment module 136 then determines in operation 404 whether the Start Date is less than the Replenish Date, where the Start Date is the later of the Last Replenishment Date or the Plan Start Date. If not, the Pending Replenishment Count is incremented by one in operation 406 (i.e., Pending Replenishment Count=Pending Replenishment Count+1), where the Pending Replenishment Count is not incremented if the Start Date is not greater than the Replenish Date. The Pending Replenishment Count is then computed in operation 408, where the exact computation can be variable selected based on the particulars of the recurring plan for the user of the wireless device 100.

In one or more exemplary aspects, merely presented for the point of illustration and without limiting the teachings to these examples, the recurring plan could be monthly plan that replenishes account parameters on a monthly basis. In this example, the Pending Replenishment Count may be computed using the formula:

Pending Replenishment Count=Pending Replenishment Count+(year of End Date−year of Start Date)*12+((month of End Date−month of Start Date)−1).

Based on this formula for the Pending Replenishment Count, a number of exemplary situations are presented. In Example 1, in which the Start Date is Jan. 1, 2009, the End Date is Jan. 10, 2009 and the Replenishment Date is 5 (i.e., the $5^{th}$ of the month), the Pending Replenishment Count=1+1+(0+(0−1))=1. This illustrates that a single replenishment will occur during the period from Jan. 1, 2009 to Jan. 10, 2009 when the replenishment date falls on the $5^{th}$ of the month. In Example 2, in which the Start Date is Dec. 1, 2008, the End Date is Jan. 1, 2010 and the Replenishment Date is 5 (i.e., the $5^{th}$ of the month), the Pending Replenishment Count=0+1+(2010−2008)12+((1−12)−1)=13. This illustrates that 13 replenishments could be pending if the wireless device had been powered off from Dec. 1, 2008 until Jan. 1, 2010. In Example 3, in which the Start Date is Jan. 1, 2009, the End Date is May 5, 2009 and the Replenishment Date is 3 (i.e., the $3^{rd}$ of the month), the Pending Replenishment Count=1+1+(0+((5−1)−1)=5. This illustrates that 5 replenishments could be pending if the wireless device had been powered off from Jan. 1, 2009 until May 5, 2009.

Referring now to FIG. 10, a more detailed operational flow diagram is provided of the auto replenish update process 308 of FIG. 8 in accordance with one more aspects. The replenishment module 136 computes an amount of replenishment of at least one internally-stored account parameter in operation 500 (corresponding to operation 140) according to replenishment parameters or rules previously stored in the wireless device 100. For example, the amount of replenishment or pending Time-Tank Balance to be replenished may be computed to equal the current Time-Tank Balance (i.e., subscription units provisioned and remaining for usage on the wireless device 100) plus the additional subscriptions units to be added (e.g., Pending Replenishment Count*recurring replenishment amount).

The replenishment module 136 then determines the cause of the auto replenishment in operation 502. If the auto replenishment is based on the receipt of an instructional message received from the control server 12, such as a recalibration/recalculation message received during the replenishment timeout period 144 (e.g., AR_PSMS_RECAL message), then replenishment module 136 updates the internally-stored replenishment parameters or rules and uses the updated replenishment parameters or rules in operation 512 to recalculate or update the amount of replenishment of the at least one internally-stored account parameter previously calculated in operation 500. The replenishment module 136 causes an acknowledgement message to be sent from the wireless device 100 to the control server 12 confirming receipt and application of the recalibration/recalculation message. The recalculated or updated amount of replenishment is then used to replenish the internally-stored account parameter(s) in operation 506, such that the recalculated pending Time-Tank Balance is applied.

If it is determined in operation 502 that the auto replenishment is handset initiated based on a determination made according to the secure timestamp 116 (e.g., AR_TIME), a determination is made in operation 504 whether replenishment of the internally-stored account parameters can be performed without first notifying the control server 12. If replenishment can be performed by the wireless device 100 without first notifying the control server 12, then the computed amount of replenishment is replenished in operation 506, such that the pending Time-Tank Balance is applied. If the control server 12 must first be notified, the replenishment module 136 causes the wireless device 100 to transmit a message to the MVNO back-end control server 12 in operation 508 (corresponding to operation 142) indicating that the replenishment module 136 intends to perform the computed replenishment. The replenishment module 136 delays performance of the replenishment for the timeout period 144 while determining in operation 510 whether a response is received from the control server 12 during the timeout period 144. If no response is received during the timeout period 144, then the computed amount of replenishment from operation 500 is used to replenish the internally-stored account parameters in operation 506, such that the pending Time-Tank Balance is applied.

If a return recalibration/recalculation message is received during the timeout period 144 (e.g., AR_PSMS_RECAL message), then replenishment module 136 performs operations 512, 514 and 506 as described above in connection with the receipt of a recalibration/recalculation message from the control server 12.

In one or more aspects, the method, device and system described in the various aspectsherein for wireless device-initiated automatic replenishment of internally-stored account parameters associated with an amount of authorization for usage of the wireless device reduce replenishment message congestion on the network elements. For example, network elements are not clogged or backlogged with replenishment messages that cannot be delivered to a wireless device 100 that may be turned off or out of a coverage area at the time replenishment is scheduled to occur. Furthermore, the method, device and system described in the various aspectsherein for wireless device-initiated automatic replenishment of internally-stored account parameters associated with an amount of authorization for usage of the wireless device ensure that replenishment procedures are implemented when required by wireless devices, even in situations where wireless devices are powered off for extended periods of time, since such replenishment procedures are initiated by the wireless device 100 itself and are not solely dependent upon receiving replenishment messages from a back-end control server 12.

In one or more aspects, a wireless device 100 may be part of a subscription plan that provides a prepaid amount of authorization of usage that is automatically replenished on a periodic basis. In one or more aspects, a plurality of wireless devices 100 may be part of a selected group that may be allocated the same predetermined amount of metered prepaid usage periodically (e.g., each month the wireless devices 100 in the selected group may be provided the same number of prepaid airtime minutes, amount or volume of data transfer or number of SMS messages, etc.). As part of the prepaid subscription plan, the wireless devices 100 may be programmed to automatically replenish the number of prepaid airtime minutes (or other account parameters) available for usage on the first of each month or at another selected time. If the provider of the prepaid subscription plan wants to change any of the usage parameters or replenishment parameters (e.g., changing the deduct rate or number of prepaid airtime minutes or other usage parameters to be replenished), the provider of the prepaid subscription plan can arrange for a recalibration/recalculation message (e.g., AR_PSMS_RECAL message) to be sent to those wireless devices 100 intended to have their replenishment parameters updated during the replenishment timeout period 144 (or at another time). Since each of the wireless devices 100 in the selected group may be powered on or off independently from the other wireless devices 100 in the selected group, auto replenishment procedures may be implemented at different times by the various wireless devices 100, even when sharing the same replenishment date, such that recalibration/recalculation message may be sent from the control server 12 to the various wireless devices 100 at different times. This varied delivery of the recalibration/recalculation message assists in reducing network congestion. In this manner, the aspects of the disclosure provide an efficient mechanism for replenishing internally-stored account parameters on a plurality of wireless devices 100 (e.g., replenishing usage parameters) that require identical updates in a manner that significantly reduces network traffic. The aspects of the disclosure further provide an efficient mechanism for replenishing internally-stored account parameters on wireless devices 100 by wholly eliminating the need for messages to be transmitted to the wireless devices 100 in order to replenish usage parameters when such usage parameters do not require updating and replenishment can simply be accomplished using internally-stored replenishment procedures.

In one exemplary embodiment, prepaid wireless devices 100 and wireless services may include wireless devices having prepaid accounts provided by public, private or governmental agencies (e.g., Lifeline or other U.S., state or local government supported programs for low income individuals that are provided free mobile phone services prepaid by the government or private entities) or provided by other individuals (e.g. family members). Mobile phones are increasingly replacing conventional land line phones, such that many states are now or will be offering Lifeline or other government supported programs for low income individuals in the form of mobile phone services in place of land line phone services. For example, the assignee of the application offers a program entitled Safelink® in which it provides low-income individuals with a free mobile phone and free monthly air time minutes in cooperation with certain states that subsidize these services to their low-income residents. Safelink® customers are allocated free monthly air time minutes every month, where such air time minutes are replenished on a monthly basis. In the past and without the benefit of the teachings, in order to change or update the prepaid internally-stored account parameters within the Safelink® group of wireless devices 100 (e.g., a state agency that wanted to change the number of free monthly air time minutes to be replenished on the wireless devices 10 of Safelink® subscribers), it was necessary for the wireless services provider to construct and transmit a unique PSMS message per wireless device/subscriber in order to change any provisioning parameters stored on the wireless device. By way of example, if each state were to provide 500,000 of its low-income residents with wireless devices 100 having prepaid airtime minutes that replenish monthly and if an average of as few as 3 of the states every month perform recalculations of the airtime minutes to be replenished (or other stored metered parameters), then 1.5 million PSMS messages would need to be uniquely generated and transmitted to the corresponding 1.5 million wireless devices 100 (3 states×500,000 wireless devices in each state) to update the replenishment parameters. The number of unique PSMS messages that could be required each month could even reach as high as 25 million PSMS messages or more if all of the states decided to perform recalculations of the air time minutes to be replenished in any given month. If this volume of PSMS messages were required to be transmitted at the same time in order to replenish airtime minutes for all of the devices at the beginning of the month, in the past and without the benefit of the teachings, this would create a massive burden and expense on backend infrastructure costs and resources to the wireless services provider in addition to overloading the bandwidth and resources of the wireless network and SMSC's. Furthermore, if some of the wireless devices 100 were powered down or out of the area, there could be a massive backlog of messages to be transmitted to such wireless devices 100. By instead only delivering recalibration/recalculation messages to the wireless devices 100 in response to a notification that certain wireless devices are about to perform replenishment procedures, the various aspects described herein reduce network congestion by avoiding having recalibration/recalculation messages transmitted to wireless devices 100 that may be powered down or out of the area.

In one or more aspects, certain methods and algorithms described in various aspects herein may be implemented in software, stored on a computer readable medium or computer readable storage medium, such as a memory of control server 12 and/or other system components, where the memory (or memories of these components) may store computer readable instructions, e.g., program code, that can be executed by a processor or controller to carry out one or more of the techniques described herein. Control server 12 may include any computer or device with a processor capable of executing logic or coded instructions, and could be a server, personal computer, set top box, smart phone, pad computer or media device, to name a few such devices. The internal architecture of control server 12 may include one or more processors (or CPUs), which interface with at least one computer bus. Also interfacing with the computer bus may be a persistent storage medium/media, network interface, memory, e.g., random access memory (RAM), run-time transient memory, read only memory (ROM), etc., media disk drive interface as an interface for a drive that can read and/or write to media including removable media such as floppy, CD ROM, DVD, etc. media, display interface as interface for a monitor or other display device, at least one input interface (e.g., keyboard interface, mouse or other pointing device interface, etc.), and miscellaneous other interfaces not shown individually, such as parallel and serial port interfaces, a universal serial bus (USB) interface, and the like.

The control server 12 memory interfaces with its computer bus so as to provide information stored in memory to processor during execution of software programs such as an operating system, application programs, device drivers, and software modules that include program code, processor-executable instructions and/or computer executable process steps, incorporating functionality described herein, e.g., one or more of process flows described herein. For example, the operations and process flows performed by control server 12 may be embodied in a provisioning software module stored in a memory of control server 12. The processor for the control server 12 loads processor-executable process steps from storage, e.g., memory, storage medium/media, removable media drive, and/or other storage device, and can then execute the stored process steps in order to execute the loaded processor-executable process steps. Stored data, e.g., data stored by a storage device, can be accessed by the processor during the execution of processor-executable process steps. Persistent storage medium/media is a computer readable storage medium(s) that can be used to store software and data, e.g., an operating system and one or more application programs, device drivers, and/or program modules and data files used to implement one or more aspectsof the disclosure.

For the purposes of this disclosure, a computer readable medium stores computer data, which data can include computer program code that is executable by a processor of the wireless device 100, control server 12, PSMS generator 14 or other computing device, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

Those skilled in the art will recognize that the devices, methods and systems of the disclosure may be implemented in many manners and as such are not to be limited by the foregoing exemplary aspects and examples. In other words, functional elements being performed by single or multiple components, in various combinations of hardware and software or firmware, and individual functions, may be distributed among software applications at either the client or server or both. In this regard, any number of the features of the different aspects described herein may be combined into single or multiple aspects, and alternate aspects having fewer than, or more than, all of the features described herein are possible. Functionality may also be, in whole or in part, distributed among multiple components, in manners now known or to become known. Thus, a myriad software/hardware/firmware combinations are possible in achieving the functions, features, interfaces and preferences described herein. Moreover, the scope of the disclosure covers conventionally known manners for carrying out the described features and functions and interfaces, as well as those variations and modifications that may be made to the hardware or software or firmware components described herein as would be understood by those skilled in the art now and hereafter.

While the apparatus and method have been described in terms of what are presently considered to be the most practical and preferred aspects, it is to be understood that the disclosure need not be limited to the disclosed aspects. It is intended to cover various modifications and similar arrangements included within the spirit and scope of the claims, the scope of which may be accorded the broadest interpretation so as to encompass all such modifications and similar structures. The disclosure includes any and all aspects of the following claims.

The invention claimed is:

1. A method for a wireless device to automatically replenish internally stored account parameters, wherein the internally stored account parameters are associated with an amount of authorization for usage of the wireless device, the method comprising:
   determining within the wireless device that at least one internally stored account parameter associated with an amount of authorization for usage of the wireless device should be replenished according to replenishment parameters stored within the wireless device;
   transmitting a message from the wireless device for delivery to a control server indicating that the wireless device intends to perform the determined replenishment according to the replenishment parameters stored within the wireless device;
   determining whether a response is received by the wireless device from the control server containing instructions to update the replenishment parameters stored within the wireless device and, if a response is received, updating the replenishment parameters stored within the wireless device before performing replenishment; and
   replenishing the at least one internally stored account parameter associated with an amount of authorization for usage of the wireless device according to the stored replenishment parameters.

2. The method of claim 1, wherein the wireless device is configured to automatically replenish the at least one internally stored account parameter associated with an amount of authorization for usage of the wireless device on a periodic basis based on the replenishment parameters stored in the wireless device regardless of whether a response is received by the wireless device from the control server.

3. The method of claim 1, further comprising:
   determining whether the response is received from the control server within a predetermined amount of time after transmitting the message from the wireless device for delivery to the control server; and
   if the response is not received within the predetermined amount of time, replenishing the at least one internally stored account parameter associated with an amount of authorization for usage of the wireless device according to the replenishment parameters stored in the wireless device.

4. The method of claim 3, wherein if the response is received from the control server within the predetermined amount of time, replenishing the at least one internally stored account parameter associated with an amount of authorization for usage of the wireless device according to the updated replenishment parameters associated with the response.

5. The method of claim 1, further comprising determining whether the at least one internally stored account parameter should be replenished according to a secure timestamp available within the wireless device.

6. The method of claim 5, further comprising:
   detecting whether tampering with the secure timestamp within the wireless device has occurred; and
   upon detection of tampering with the secure timestamp, preventing replenishment of the at least one internally stored account parameter from occurring.

7. The method of claim 6, further comprising transmitting a notification message for delivery to the control server indicating that tampering with the secure timestamp has been detected.

8. The method of claim 1, wherein the stored replenishment parameters include a predetermined number of replenishments of at least one internally stored account parameter that can be performed, such that when determining whether the at least one internally stored account parameter should be replenished, the method further comprises:
 determining whether the predetermined number of replenishments have already been performed; and
 preventing replenishment of the at least one internally stored account parameter once the predetermined number of replenishments have already been performed.

9. A computer program product comprising a non-transitory computer-readable medium having instructions, the instructions being operable to enable a wireless device, when executed by a processor, to perform a method for automatically replenishing internally stored account parameters, wherein the internally stored account parameters are associated with an amount of authorization for usage of the wireless device, the method comprising:
 determining within the wireless device that at least one internally stored account parameter associated with an amount of authorization for usage of the wireless device should be replenished according to replenishment parameters stored within the wireless device;
 transmitting a message from the wireless device for delivery to a control server indicating that the wireless device intends to perform the determined replenishment according to the replenishment parameters stored within the wireless device;
 determining whether a response is received by the wireless device from the control server containing instructions to update the replenishment parameters stored within the wireless device and, if a response is received, updating the replenishment parameters stored within the wireless device before performing replenishment; and
 replenishing the at least one internally stored account parameter associated with an amount of authorization for usage of the wireless device according to the stored replenishment parameters.

10. The computer program product of claim 9, wherein the instructions for automatically replenishing internally stored account parameters further include instructions for automatically replenishing the at least one internally stored account parameter associated with an amount of authorization for usage of the wireless device on a periodic basis based on the replenishment parameters stored in the wireless device regardless of whether a response is received by the wireless device from the control server.

11. The computer program product of claim 9, wherein the method further comprises:
 determining whether the response is received from the control server within a predetermined amount of time after transmitting the message from the wireless device for delivery to the control server; and
 if the response is not received within the predetermined amount of time, replenishing the at least one internally stored account parameter associated with an amount of authorization for usage of the wireless device according to the replenishment parameters stored in the wireless device.

12. The computer program product of claim 11, wherein the method further comprises:
 if the response is received from the control server within the predetermined amount of time, replenishing the at least one internally stored account parameter associated with an amount of authorization for usage of the wireless device according to updated replenishment parameters associated with the response.

13. The computer program product of claim 9, wherein the method further comprises determining whether the at least one internally stored account parameter should be replenished according to a secure timestamp available within the wireless device.

14. The computer program product of claim 13, wherein the method further comprises:
 detecting whether tampering with the secure timestamp within the wireless device has occurred; and
 upon detection of tampering with the secure timestamp, preventing replenishment of the at least one internally stored account parameter from occurring.

15. The computer program product of claim 14, wherein the method further comprises transmitting a notification message for delivery to the control server indicating that tampering with the secure timestamp has been detected.

16. The computer program product of claim 9, wherein the stored replenishment parameters include a predetermined number of replenishments of at least one internally stored account parameter that can be performed, wherein when determining whether the at least one internally stored account parameter should be replenished, the method further comprises:
 determining whether the predetermined number of replenishments have already been performed; and
 preventing replenishment of the at least one internally stored account parameter once the predetermined number of replenishments have already been performed.

17. A wireless device configured to automatically replenish internally stored account parameters associated with an amount of authorization for usage of the wireless device, the device comprising:
 means for determining within the wireless device that at least one internally stored account parameter associated with an amount of authorization for usage of the wireless device should be replenished according to replenishment parameters stored within the wireless device;
 means for transmitting a message from the wireless device for delivery to a control server indicating that the wireless device intends to perform the determined replenishment according to the replenishment parameters stored within the wireless device;
 means for determining whether a response is received by the wireless device from the control server containing instructions to update the replenishment parameters stored within the wireless device and, if a response is received, updating the replenishment parameters stored within the wireless device before performing replenishment; and
 means for replenishing the at least one internally stored account parameter associated with an amount of authorization for usage of the wireless device according to the stored replenishment parameters.

18. The wireless device of claim 17, further comprising means for automatically replenishing the at least one internally stored account parameter associated with an amount of authorization for usage of the wireless device on a periodic basis based on the replenishment parameters stored in the wireless device regardless of whether a response is received by the wireless device from the control server.

19. The wireless device of claim 17, further comprising:
 means for determining whether the response is received from the control server within a predetermined amount of time after transmitting the message from the wireless device for delivery to the control server; and if the response is not received within the predetermined amount of time, means for replenishing the at least one internally stored account parameter associated with an amount of authorization for usage of the wireless device according to the replenishment parameters stored in the wireless device.

20. The wireless device of claim 19, further comprising means for, if the response is received from the control server within the predetermined amount of time, replenishing the at least one internally stored account parameter associated with an amount of authorization for usage of the wireless device according to updated replenishment parameters associated with the response.

21. The wireless device of claim 17, further comprising means for determining whether the at least one internally stored account parameter should be replenished according to a secure timestamp available within the wireless device.

22. The wireless device of claim 21, further comprising:
means for detecting whether tampering with the secure timestamp within the wireless device has occurred; and
means for, upon detection of tampering with the secure timestamp, preventing replenishment of the at least one internally stored account parameter from occurring.

23. The wireless device of claim 22, further comprising means for transmitting a notification message for delivery to the control server indicating that tampering with the secure timestamp has been detected.

24. The wireless device of claim 17, wherein the stored replenishment parameters include a predetermined number of replenishments of at least one internally stored account parameter that can be performed, such that the means for determining whether the at least one internally stored account parameter should be replenished are further configured for:
determining whether the predetermined number of replenishments have already been performed; and
preventing replenishment of the at least one internally stored account parameter once the predetermined number of replenishments have already been performed.

* * * * *